(12) United States Patent
Anzai

(10) Patent No.: US 6,232,734 B1
(45) Date of Patent: May 15, 2001

(54) POWER MODULE

(75) Inventor: Kiyoharu Anzai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,581

(22) Filed: Nov. 4, 1999

(30) Foreign Application Priority Data

Jun. 1, 1999 (JP) .................................................. 11-154317

(51) Int. Cl.⁷ ....................................................... H02H 7/08
(52) U.S. Cl. .............................................. 318/434; 388/903
(58) Field of Search .................................... 318/434, 563; 388/903, 909; 361/23, 31, 33

(56) References Cited

U.S. PATENT DOCUMENTS

| | | | |
|---|---|---|---|
| 5,063,338 | * | 11/1991 | Capel et al. ........................... 318/685 |
| 5,497,289 | * | 3/1996 | Sugishima et al. ............... 318/558 X |
| 5,577,890 | * | 11/1996 | Nielsen et al. ..................... 318/729 X |
| 5,610,493 | * | 3/1997 | Wieloch ................................ 318/801 |

FOREIGN PATENT DOCUMENTS 9-51068 2/1997 (JP) .
10-267977 10/1998 (JP) .

* cited by examiner

*Primary Examiner*—Bentsu Ro
(74) *Attorney, Agent, or Firm*—Sughrue, Mion, Zinn, Macpeak & Seas, PLLC

(57) ABSTRACT

A power module which enables the effective use of the operation range of each power element.

The power module having power elements for driving a motor, self protection means for protecting the power module from a plurality of predetermined abnormal phenomena, and power element drive means for driving and controlling the power elements based on a drive signal from an external unit and the output of the self protection means comprises:
 decision value storage means for storing decision values for the detection of the plurality of predetermined abnormal phenomena by the self protection means; and
 information transmission means for receiving the decision values set by the external unit, outputting them to the decision value storage means and outputting the decision values stored in the decision value storage means to the external unit.

5 Claims, 5 Drawing Sheets

POWER MODULE

BACKGROUND OF THE INVENTION

The present invention relates to a power module having a self protection function. The term "power module" as used herein means a unit comprising power elements such as power transistors and other function, for example, a control unit stored in a single package.

Heretofore, there has been known an intelligent power module as a power module having a self protection function. The term "intelligent power module" (to be simply referred to as "power module" hereinafter) as used herein generally means a module comprising power elements such as power transistors and a control unit for driving and controlling the power elements stored in a single package.

For instance, a prior art power module 2 disclosed by Japanese Laid-open Patent Application No. 10-267977 and shown in FIG. 4 comprises power elements 4 for driving a motor 1, power element drive means 3 for driving and controlling the power elements 4 and self protection means 5 having a self protection function.

The self protection means 5 protects the power module 2 from a plurality of predetermined abnormal phenomena and outputs an abnormality detection signal to the outside when it detects an abnormal phenomenon.

The power element drive means 3 drives and controls the power elements 4 based on a drive signal from an external unit and the output of the self protection means 5.

As shown in FIG. 5, the self protection means 5 comprises an overcurrent protection circuit 51 for protecting the power elements 4, for example, when a current higher than a predetermined current value runs through the power elements 4 incorporated in the power module 2, a short-circuit protection circuit 52 for protecting the power elements 4 or a circuit connected to the power elements 4 when a short-circuit accident occurs in the power elements 4, a control power voltage drop protection circuit 53 for protecting the power module 2 when a control power voltage supplied to the power module 2 falls, an excessive temperature protection circuit 54 for protecting the module from an excessive temperature in the power module 2, and a decoder 55 for decoding binary signals from the above protection circuits 51 to 54 to generate an abnormality detection signal and supplying it to a plurality of output terminals F1 to F3 as a binary signal.

That is, the protection circuits 51 to 54 are incorporated in the power module 2 to cope with a plurality of predetermined abnormal phenomena, and the self protection means 5 outputs an abnormality detection signal to the external unit through the output terminals FOI to FO3 when the protection circuit 51 to 54 fulfill their self protection functions.

When the plurality of the protection circuits 51 to 54 fulfill their functions independently, a protection circuit fulfilling its function is identified by an abnormality detection signal and reported. When two or more protection circuits fulfill their functions at the same time to cope with a plurality of abnormal phenomena which occur at the same time, they are reported with abnormality detection signals at a time.

SUMMARY OF THE INVENTION

The plurality of protection circuits provided to cope with a plurality of predetermined abnormal phenomena are each composed of hardware, and decision values for detecting the abnormal phenomena are fixed at design values which takes into consideration differences in the power elements 4.

Therefore, the above decision values include a great margin, which makes the operation range of each of the power element 4 narrower than the actual range, thereby making impossible the effective use of the operation range of the power element 4.

It is an object of the present invention which has been made to solve the above problem to provide a power module which enables the effective use of the operation range of each power element.

The power module having self protection means according to the present invention comprises decision value storage means for storing decision values for the detection of a plurality of predetermined abnormal phenomena by the self protection means and information transmission means for receiving decision values set by an external unit, outputting the decision values to the decision value storage means and outputting the decision values stored in the decision value storage means to external unit.

The power module comprises power elements for driving a motor, self protection means provided to protect the power module from a plurality of predetermined abnormal phenomena, information transmission means for receiving information from an external unit and outputting information to the external unit, information storage means for storing information from the external unit input by the information transmission means, motor control means for generating a motor control signal based on a control instruction from the external unit and the output of the self protection means, and power element drive means for driving and controlling the power elements based on a motor control signal from the motor control means and the output of the self protection means and serves as a motor controller for controlling various types of motors.

The above information transmission means is an interface circuit for receiving decision values for the detection of a plurality of predetermined abnormal phenomena by the self protection means as information from the external unit and information on the control of the motor such as motor control algorithms and algorithms for judging the abnormality of the power elements and outputting this information to the external unit, and a control program for the control of the motor can be set and changed in addition to the decision values.

A plurality of the information transmission means are provided for communication between modules and used as interface circuits having a communication system for at least one of external units having different communication protocols to enable communication with the external units having different communication protocols.

The above motor control means outputs an alarm to the external unit based on the output of the self protection means.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
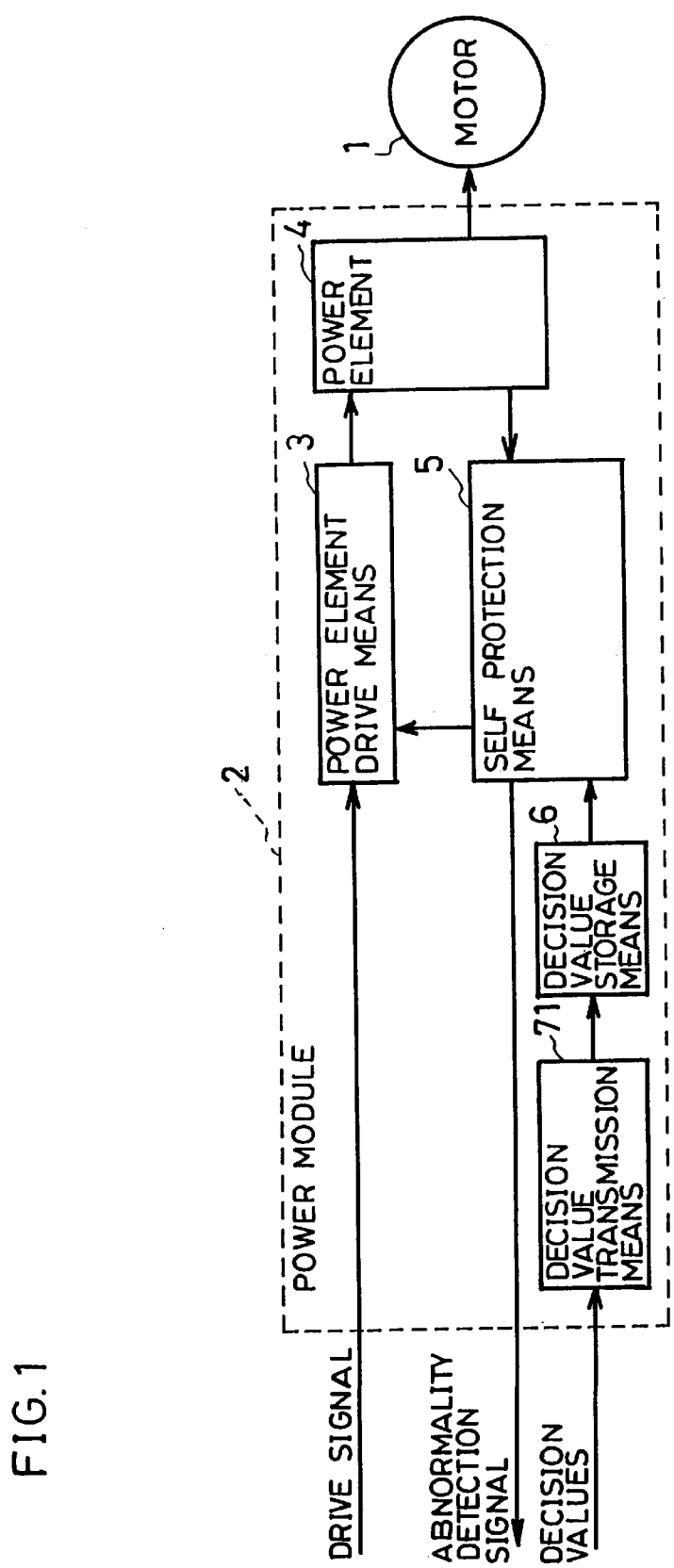
FIG. 1 is a block diagram showing the configuration of a power module according to Embodiment 1 of the present invention.

Embodiment 1 of the present invention will be described hereinunder with reference to FIG. 1.

A power module 2 having a self protection function according to Embodiment 1 of the present invention comprises power elements 4 for driving a motor 1, self protection means 5, provided in the power module 2, for protecting the power module 2 from a plurality of predetermined abnormal phenomena, power element drive means 3 for driving and controlling the power elements 4 based on a drive signal from the outside and the output of the self protection means 5, decision value storage means 6 for storing decision values for the detection of the plurality of predetermined abnormal phenomena by the self protection means 5, and decision value (information) transmission means 71 for transmitting the decision values to external units.

Figure 4:
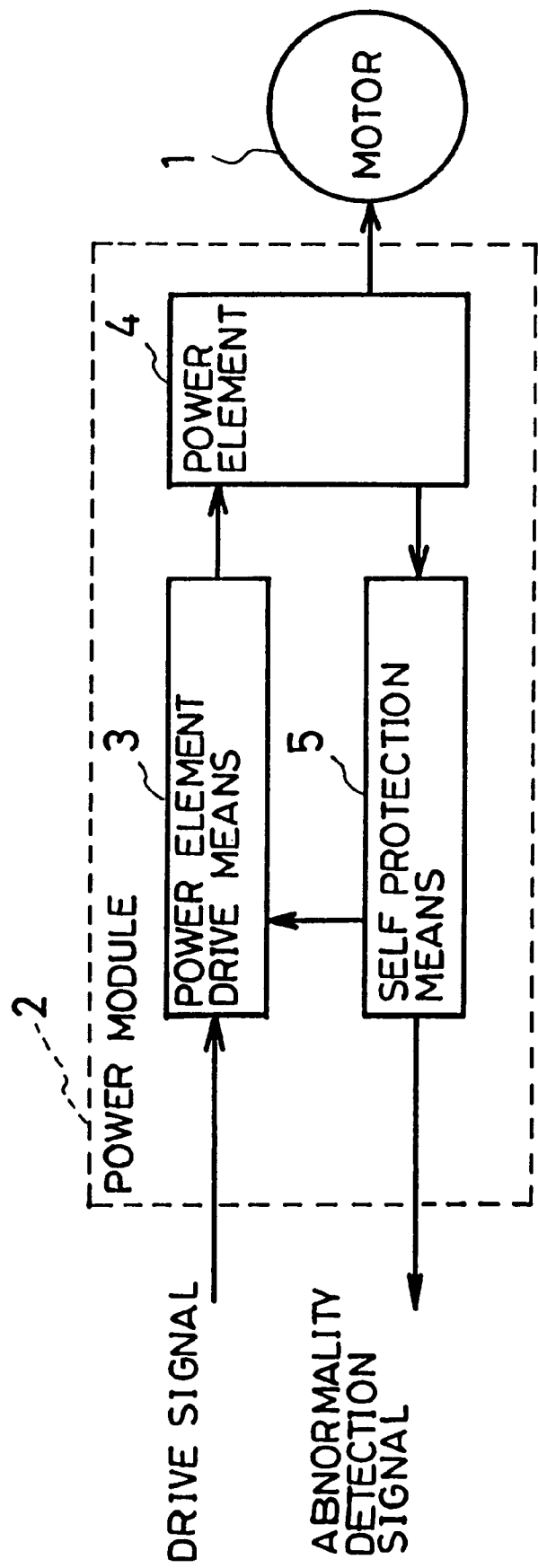
FIG. 4 is a block diagram showing an example of power module of the prior art.
Figure 5:
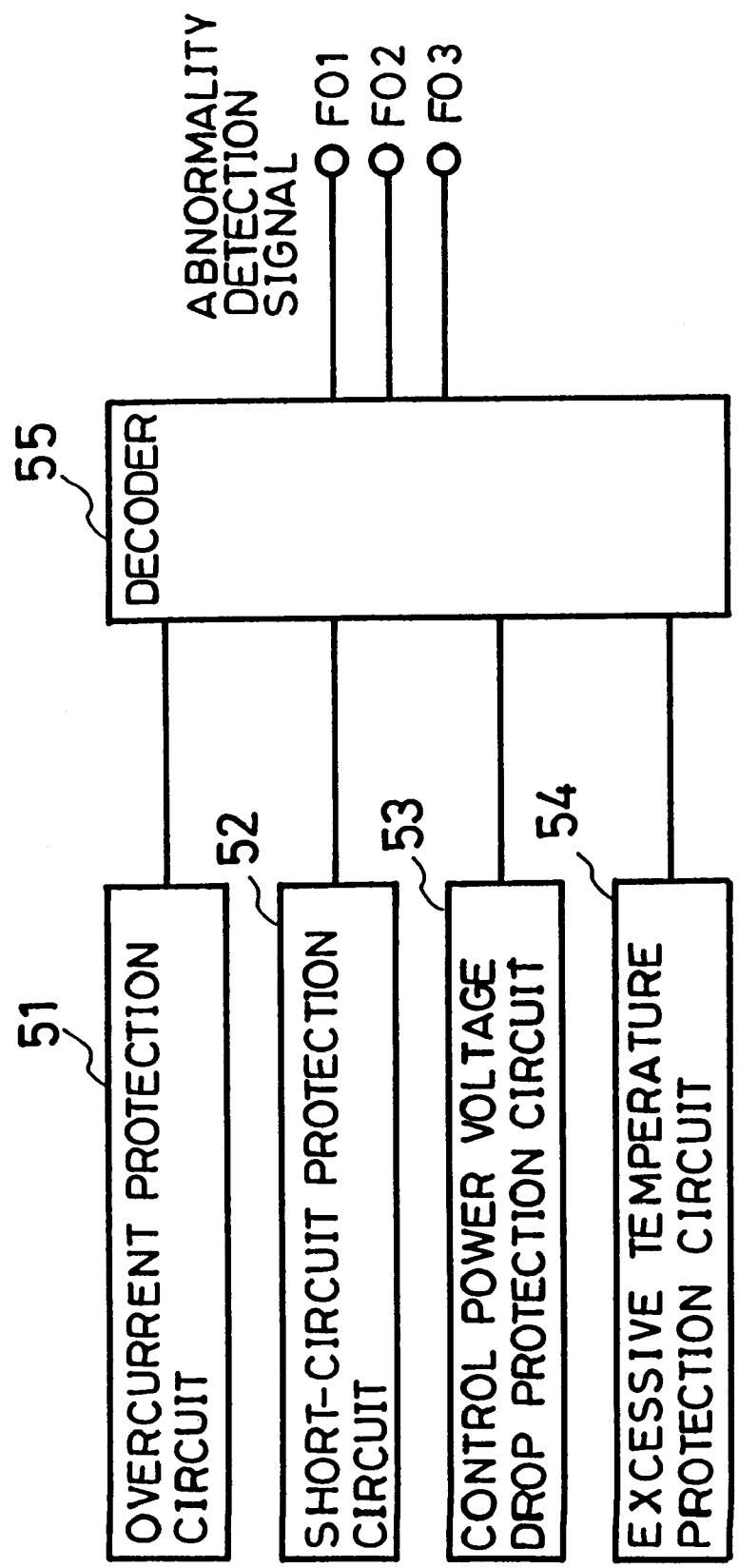
FIG. 5 is a structural diagram showing an example of self protection means of the prior art.

Since the above power elements 4, the power element drive means 3 and the self protection means 5 are basically identical to those of the power module of the prior art which has been described with reference to FIG. 4 and FIG. 5, their descriptions are omitted.

The above decision value storage means 6 is a storage device such as a flash ROM, and the decision value transmission means 71 is an interface circuit for writing (or reading) the decision values to the flash ROM as the decision value storage means 6. That is, the decision values to be stored in the flash ROM can be set and changed from an external unit and read to the external unit for confirmation through the decision value transmission means 71.

The decision values stored in the flash ROM to enable the self protection means to detect the plurality of predetermined abnormal phenomena are compared with the operation state of each of the power elements 4 by the self protection means 5. When the operation state of the power element 4 is outside the decision values, the self protection means 5 detects that an abnormal phenomenon occurs in the power element 4 or the like.

The decision values are obtained from data obtained by automatically measuring the characteristic properties of the power element 4 in a production line.

Thus, the decision values can be set and changed from the external unit during or after the production process of the power module 2 by providing the decision value storage means 6 for detecting a plurality of predetermined abnormal phenomena by means of the self protection means 5. Therefore, the decision values for detecting abnormal phenomena can be set for each power element 4, each power module 2 or each production lot individually regardless of differences in the power elements 4 to enable the effective use of the operation range of the power element 4.

Since each of the decision values can be changed to a value in which deterioration (judged based on the internal resistance of the power element 4) or the like is taken into account for maintenance, the power element 4 can be always operated at a safe operation range, thereby making it possible to prevent the destruction of the power element 4 in operation.

Embodiment 2

Embodiment 2 of the present invention will be described hereinunder with reference to FIG. 2.

A power module 2 having a self protection function comprises power elements 4 for driving a motor 1, self protection means 5, provided in the power module 2, for protecting the power module 2 from a plurality of predetermined abnormal phenomena, first information transmission means 72a for transmitting information to an external unit, motor control means 8 for storing the output of the first information transmission means 72a, generating a motor control signal based on a control instruction from the external unit and the output of the self protection means 5 and outputting an alarm to the external unit based on the output of the self protection means 5, and power element drive means 3 for driving and controlling the power elements 4 based on a motor control signal from the motor control means 8 and the output of the self protection means 5.

The above motor control means 8 incorporates a microcomputer. When the recently developed HVIC (High voltage IC) technology is introduced, it is possible to connect a high-voltage portion (power portion) and a low-voltage portion (control portion) of the power module 2 directly and it is easy to incorporate the microcomputer in the power module 2. Therefore, it is possible to use the power module 2 as a motor control unit by providing the motor control means 8 in the power module 2.

The first information transmission means 72a is an interface circuit for writing (or reading) information to a flash ROM incorporated in the microcomputer. That is, the decision values stored in the flash ROM can be set and changed from the external unit and read to the external unit for confirmation through the first information transmission means 72a.

The decision values stored in the flash ROM for detecting the plurality of predetermined abnormal phenomena are compared with the operation state of each of the power elements 4 by the self protection means 5. When the operation state of the power element 4 is outside the decision values, the self protection means 5 detects that an abnormal phenomenon occurs in the power element 4 or the like and causes the power element drive means 3 to protect the power elements 4. That is, the output of the self protection means 5 is applied to the microcomputer which in turn outputs a motor control signal to the power element drive means 3 to protect the power elements 4 according to the state of the abnormal phenomenon and outputs an alarm to the external unit.

Motor control algorithms and algorithms for judging the abnormality of the power elements 4 can be altered by changing the control program of the microcomputer by writing to the flash ROM. For instance, the motor control algorithms can be changed to control algorithms according to the type of a motor (such as an induction motor or DC brushless motor) or control algorithms according to the specifications of a motor (motor constant, output capacity, revolution speed) and hence, the power module 2 can be used as a motor control unit for controlling various types of motors. Control programs can be set for each type of motor individually.

The second information transmission means 72b is an interface circuit for a communication module incorporated in the microcomputer.

Figure 2:
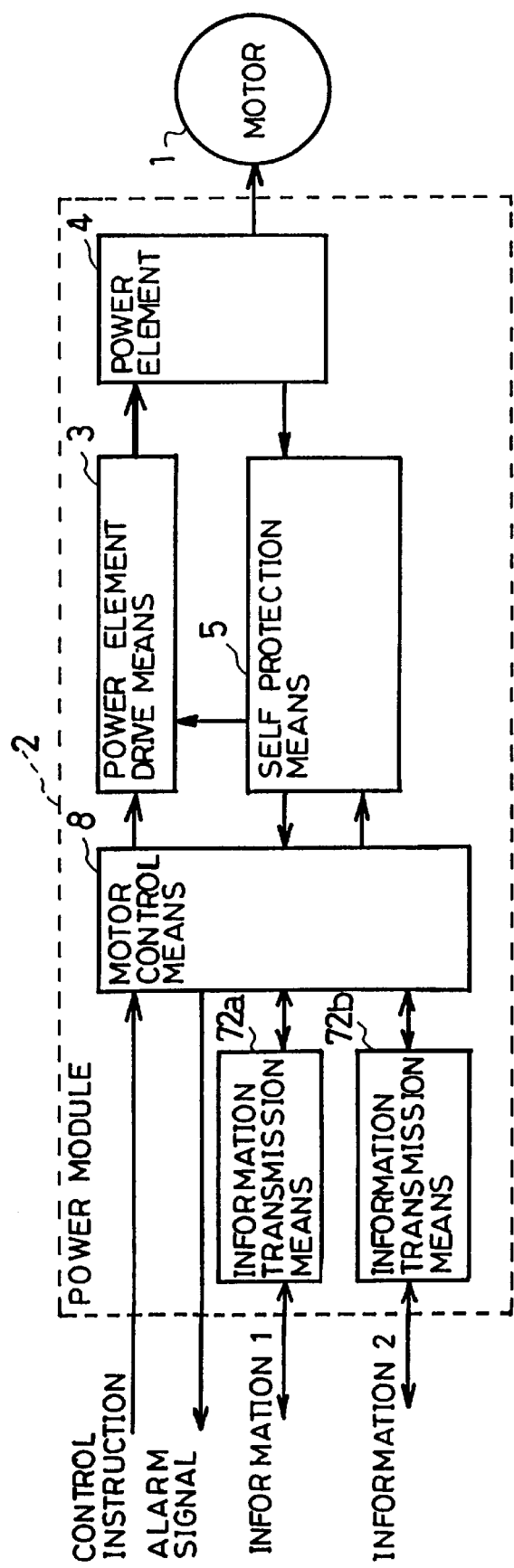
FIG. 2 is a block diagram showing the configuration of a power module according to Embodiment 2 of the present invention.

Therefore, in FIG. 2, the first information transmission means 72a for transmitting decision values and a control program as first information and the second information transmission means 72b for transmission communication information between modules are provided in the module 2.

A plurality of the second information transmission means 72b for communication between modules may be provided and used as interface circuits having a communication system for at least one of external units having different communication protocols.

In other words, communication such as serial communication or CAN with external units having various communication protocols is made possible by providing the plurality of information transmission means 72b.

A plurality of modules can be operated by synchronization.

Figure 3:
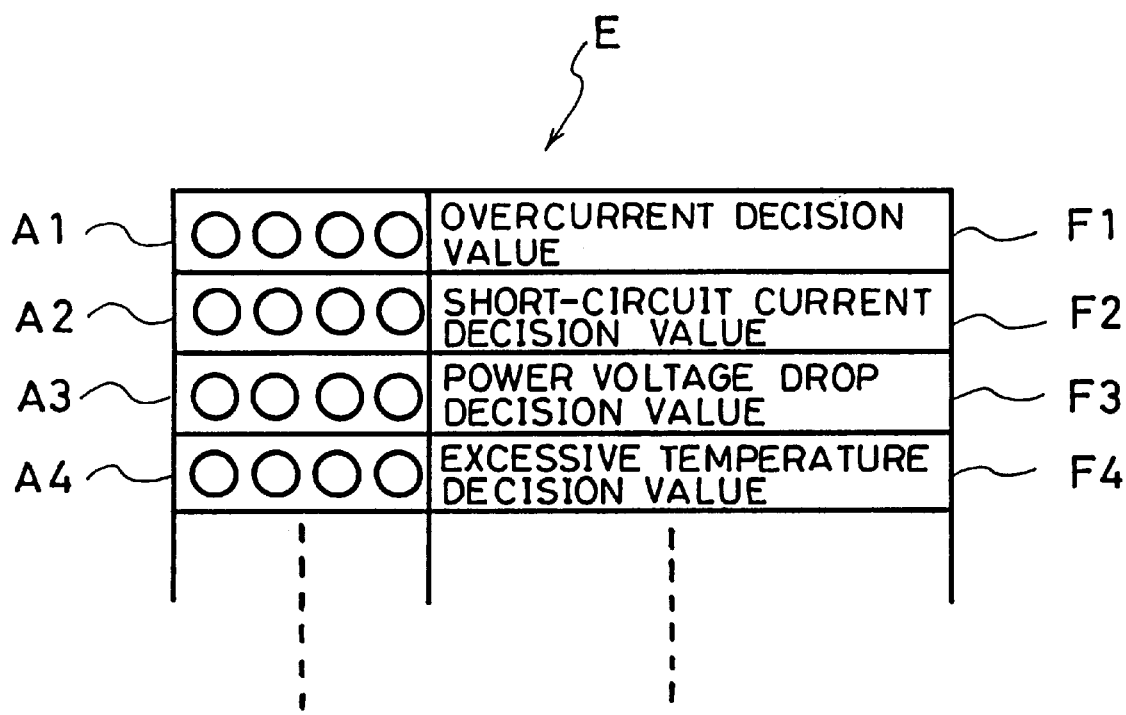
FIG. 3 is a diagram for explaining how to set and change decision values stored in a flash ROM in Embodiments 1 and 2.

The setting and change of each decision value can be carried out by managing the regions of the decision values F1 to F4 to be written to the flash ROM by the microcomputer incorporated in the external unit or the motor control means as addresses A1 to A4 as shown in FIG. 3.

According to the present invention, since the decision value storage means for storing decision values for the detection of a plurality of predetermined abnormal phenomena by the self protection means, the decision values can be set and changed for each power element, each module or each production lot regardless of differences in the power elements, thereby making possible the effective use of the operation range of each of the power elements. Since each of the decision values can be changed to a decision value in which the deterioration or the like of the power element is taken into account for maintenance, the power element can be always operated at a safe operation range, thereby making it possible to prevent the destruction of the power element in operation.

Since the motor control means incorporating the information storage means is provided, it is possible to use it as a motor control unit for controlling various types of motors. Particularly when an interface circuit is provided as information transmission means for transmitting information on the control of a motor, a motor control program such as motor control algorithms and algorithms for judging the abnormality of the power element can be set and a control program for each type of motor can be set as well.

Communication with external units having various communication protocols is made possible by providing a plurality of interface circuits having a communication system for at least one of external units having different communication protocols and a plurality of power modules can be operated by synchronization.

Since the motor control means has the function of outputting an alarm to an external unit based on the output of the self protection means, alarms against various abnormalities can be output to the external unit.

What is claimed is:

1. A power module comprising:

power elements for driving a motor;

self protection means for protecting the power module from a plurality of predetermined abnormal phenomena;

power element drive means for driving and controlling the power elements based on a drive signal from an external unit and the output of the self protection means;

decision value storage means for storing decision values for the detection of the plurality of predetermined abnormal phenomena by the self protection means; and information transmission means for receiving the decision values set by the external unit, outputting them to the decision value storage means and outputting the decision values stored in the decision value storage means to the external unit.

2. A power module comprising:

power elements for driving a motor;

self protection means for protecting the power module from a plurality of predetermined abnormal phenomena;

information transmission means for receiving information from an external unit and outputting information to the external unit;

motor control means, having information storage means for storing information input from the external unit by the information transmission means, for generating a motor control signal based on a control instruction from the external unit and the output of the self protection means; and power element drive means for driving and controlling the power elements based on the motor control signal from the motor control means and the output of the self protection means.

3. The power module of claim 2, wherein the information transmission means is an interface circuit for receiving decision values for the detection of a plurality of predetermined abnormal phenomena by the self protection means and information on the control of the motor including motor control algorithms and algorithms for judging the abnormality of the power elements and outputting the information to the external unit.

4. The power module of claim 2, wherein a plurality of the information transmission means are provided and used as interface circuits having a communication system for at least one of external units having different communication protocols.

5. The power module of claim 2, wherein the motor control means outputs an alarm to the external unit based on the output of the self protection means.

* * * * *